United States Patent
Gibbons et al.

(10) Patent No.: US 7,863,383 B2
(45) Date of Patent: Jan. 4, 2011

(54) POLYOLEFIN BASED PEELABLE SEALS

(75) Inventors: Julie W. Gibbons, Lake Jackson, TX (US); Alveda J. Williams, Pearland, TX (US); Rajen M. Patel, Lake Jackson, TX (US); Jeffrey J. Wooster, Houston, TX (US); Enrique Torres, Thalwil (CH); Miguel A. Prieto Goubert, Richterswil (CH); Olga Bertran, Tarragona (ES)

(73) Assignee: Dow Global Technologies Inc., Midland, MI (US)

( * ) Notice: Subject to any disclaimer, the term of this patent is extended or adjusted under 35 U.S.C. 154(b) by 263 days.

(21) Appl. No.: 12/088,447

(22) PCT Filed: Sep. 8, 2006

(86) PCT No.: PCT/US2006/034957

§ 371 (c)(1),
(2), (4) Date: Mar. 28, 2008

(87) PCT Pub. No.: WO2007/044159

PCT Pub. Date: Apr. 19, 2007

(65) Prior Publication Data

US 2008/0255296 A1    Oct. 16, 2008

Related U.S. Application Data

(60) Provisional application No. 60/728,860, filed on Oct. 21, 2005, provisional application No. 60/723,667, filed on Oct. 5, 2005.

(51) Int. Cl.
*C08L 23/00* (2006.01)
*C08L 23/04* (2006.01)
*C08L 23/10* (2006.01)
*C08K 5/00* (2006.01)

(52) U.S. Cl. .................. 525/191; 525/240; 525/241; 524/515

(58) Field of Classification Search .............. 525/191, 525/240, 241, 515
See application file for complete search history.

(56) References Cited

U.S. PATENT DOCUMENTS

| 4,599,392 | A | 7/1986 | McKinney et al. |
| 5,837,369 | A | 11/1998 | Grunberger et al. |
| 6,010,588 | A | 1/2000 | Stahl et al. |
| 6,590,034 | B2 | 7/2003 | Wanic et al. |
| 6,630,237 | B2 | 10/2003 | Rivett et al. |
| 6,632,521 | B2 | 10/2003 | Christopherson et al. |
| 2002/0013415 | A1 | 1/2002 | Mechelaere et al. |
| 2007/0009753 | A1 | 1/2007 | Sato |

FOREIGN PATENT DOCUMENTS

| EP | 0 258 527 | 3/1988 |
| JP | 2003/105164 | 4/2003 |
| WO | WO-03/040442 A1 | 5/2003 |
| WO | WO-2007/047133 | 4/2007 |

OTHER PUBLICATIONS

International Search Report PCT/US2006/034957.

*Primary Examiner*—Nathan M Nutter

(57) ABSTRACT

The invention relates to a polyolefin-based heat sealable and peelable seal. The peelable seals comprise from 5 to 98 percent by weight of a propylene based plastomer or elastomer and from 2 to 95 percent by weight of a second polymer selected from the group consisting of polyethylene, polybutylene, and styrenic polymer and mixtures thereof. The invention also relates to tamper evident peelable seals. The invention also relates to methods of making and using the heat sealable, peelable seal.

20 Claims, 3 Drawing Sheets

Heat Seal Graph (Peelable Seals)

Peel Curve of a film on a PP Sheet

POLYOLEFIN BASED PEELABLE SEALS

This application is a non-provisional 371 national phase patent application of International Patent Application No. PCT/US2006/034957, filed on Sep. 8, 2006, entitled "POLYOLEFIN BASED PEELABLE SEALS", which claims priority from the U.S. Provisional Patent Application No. 60/723,667, filed on Oct. 5, 2005, entitled "POLYOLEFIN BASED PEELABLE SEALS", and which claims priority from the U.S. Provisional Patent Application No. 60/728,860, filed on Oct. 21, 2005, entitle "POLYOLEFIN BASED PEELABLE SEALS," the teachings of which are incorporated by reference herein, as if reproduced in full hereinbelow.

The invention relates to a polyolefin-based heat sealable and peelable seal. The invention also relates to tamper evident peelable seals. The invention also relates to methods of making and using the heat sealable, peelable seal.

Heat sealable and peelable films (also referred to herein as "peelable seals") are employed on a large scale for temporarily closing containers that include, for example, food products or medical devices. During use, a consumer opens the package by separating the heat sealed layers of the peelable film. To gain consumer acceptance, a number of characteristics associated with a heat sealable and peelable film are desired. For example, the film should provide a leak-proof closure of the container or bag. To seal a bag, heat sealing is commonly used. Various apparatus have been constructed for the purpose of forming bags while simultaneously filling the bags with the desired contents. These apparatus are commonly known as vertical form-fill-and-seal and horizontal form-fill-and-seal machines. Other types of forming machines may also be used, as may pre-made bags.

These machines typically have forming collars or bars that shape a flat piece of film into a tubular shape of a bag. Hot metal sealing jaws are moved from an open position to a closed position, contacting the film in order to seal it into a bag shape. During the sealing process, the outer layer of the film comes into direct contact with the hot metal surface of the sealing jaws. Heat is thus transferred through the outer layer of the film to melt and fuse the inner sealant layer to form a seal. Generally, the outer layer has a higher melting temperature than the inner sealant layer. As such, while the inner sealant layer is melted to form a seal, the outer layer of the film does not melt and is not stuck to the sealing jaws. After the sealing jaws reopen, the film is cooled to room temperature.

Before the inner sealant layer is cooled to room temperature, it should be able to maintain its seal integrity. The ability of an adhesive or sealant layer to resist creep of the seal while it is still in a warm or molten state is generally referred to as "hot tack." To form a good seal, the hot tack of the sealable and peelable film should be adequate.

Besides adequate hot tack, it is also desirable to have a low heat seal initiation temperature which helps to ensure fast packaging line speeds and a broad sealing window which could accommodate variability in process conditions, such as pressure and temperature. A broad sealing window also enables high speed packaging of heat sensitive products, as well as, provides a degree of forgiveness for changes in packaging or filling speeds.

In addition to the "sealable" characteristic of a sealable and peelable film, it should also have a desired "peelable" characteristic needed to provide an easily openable seal on a package or bag. Peelability generally refers to the ability to separate two materials or substrates in the course of opening a package without compromising the integrity of either of the two. The force required to pull a seal apart is called "seal strength" or "heat seal strength" which can be measured in accordance with ASTM F88-94. The desired seal strength varies according to specific end user applications. For flexible packaging applications, such as cereal liners, snack food packages, cracker tubes and cake mix liners, the seal strength desired is generally in the range of 1-9 pounds per inch. For example, for easy-open cereal box liners, a seal strength in the range of 2-3 pounds per inch is commonly specified, although specific targets vary according to individual manufactures requirements. In addition to flexible packaging application, a sealable and peelable film can also be used in rigid package applications, such as lids for convenience items (for example, snack food such as puddings) and medical devices. Typical rigid packages have a seal strength of 1-5 pounds per inch. The seal layer can be on the lid or on the container or both.

Additional desired characteristics for a heat sealable and peelable film include a low coefficient of friction and good abuse resistance. A low coefficient of friction ensures that the sealant layer can be processed smoothly and efficiently on fabrication and packaging equipment and is particularly important for vertical form-fill-and-seal packaging. Good abuse resistance and toughness is desired, for example, in cereal box liners to withstand tears and punctures from irregularly-shaped, rigid cereals. Additional characteristics include taste and odor performance and barrier or transmission properties.

Some peelable seals are re-sealable meaning that once the packaging has been unsealed they can be resealed. In some applications, it is important to be able to identify when the package has been unsealed as, for example, it may indicate when a package has been the subject of tampering.

Heat sealable and peelable films are generally made from one or more polymeric resins. The resulting characteristics of a heat sealable and peelable film depend largely upon the type of the resins used to form the film. For example, ethylene vinyl acetate (EVA) and ethylene methyl acrylate (EMA) copolymers provide excellent heat sealing properties. However, the seals produced with these copolymers are such that separation usually cannot be achieved without damage to the film. To alleviate this problem, polybutylene is mixed with an EVA polymer to produce a heat sealable and peelable film. Although the peelability of the film is improved, the heat sealable and peelable film has some unpleasant odor due to the presence of EVA. In addition to using polybutylene, some ionomers, such as SURLYN®, is mixed with EVA to produce a heat sealable and peelable film. While the film is peelable, it causes stringiness or "angel hair" upon separation of the film. Moreover, ionomers are generally expensive and may have some odor as well.

U.S. Pat. No. 6,590,034 describes peelable seals made from a mixture of two immiscible polymers which form a continuous phase and a discontinuous phase wherein the absolute value of the shear viscosity differential of the two polymers is less than 100 percent. Although many potential materials are covered, this reference focuses on the use of homopolymer polypropylene as the discontinuous phase.

Although a number of resins systems have been employed to make a heat sealable and peelable film, there continues to exist a need for an improved cost-effective heat sealable and peelable film with desired seal strength during processing and transportation as well as during package opening by the end consumer. It is desirable that the resin system used to produce the heat sealable and peelable film has a relatively lower seal initiation temperature and a relatively broad heat sealing window. It is also desirable that the heat sealable and peelable film is relatively age-resistant and has a relatively lower coefficient of friction and good abuse resistance and toughness.

It has been discovered that blends from 5 to 98 percent by weight propylene based elastomers or plastomers with a particular second polymer from a group preferably consisting of polyethylene and styrenic polymers, have a seal strength in the range that would make them particularly well suited for use as a peelable seal. In some embodiments of the present invention, the peelable seals of this invention age down in seal strength, so that the bags can be sealed securely when the package is formed but are easy to open when they reach the consumer.

Figure 1:
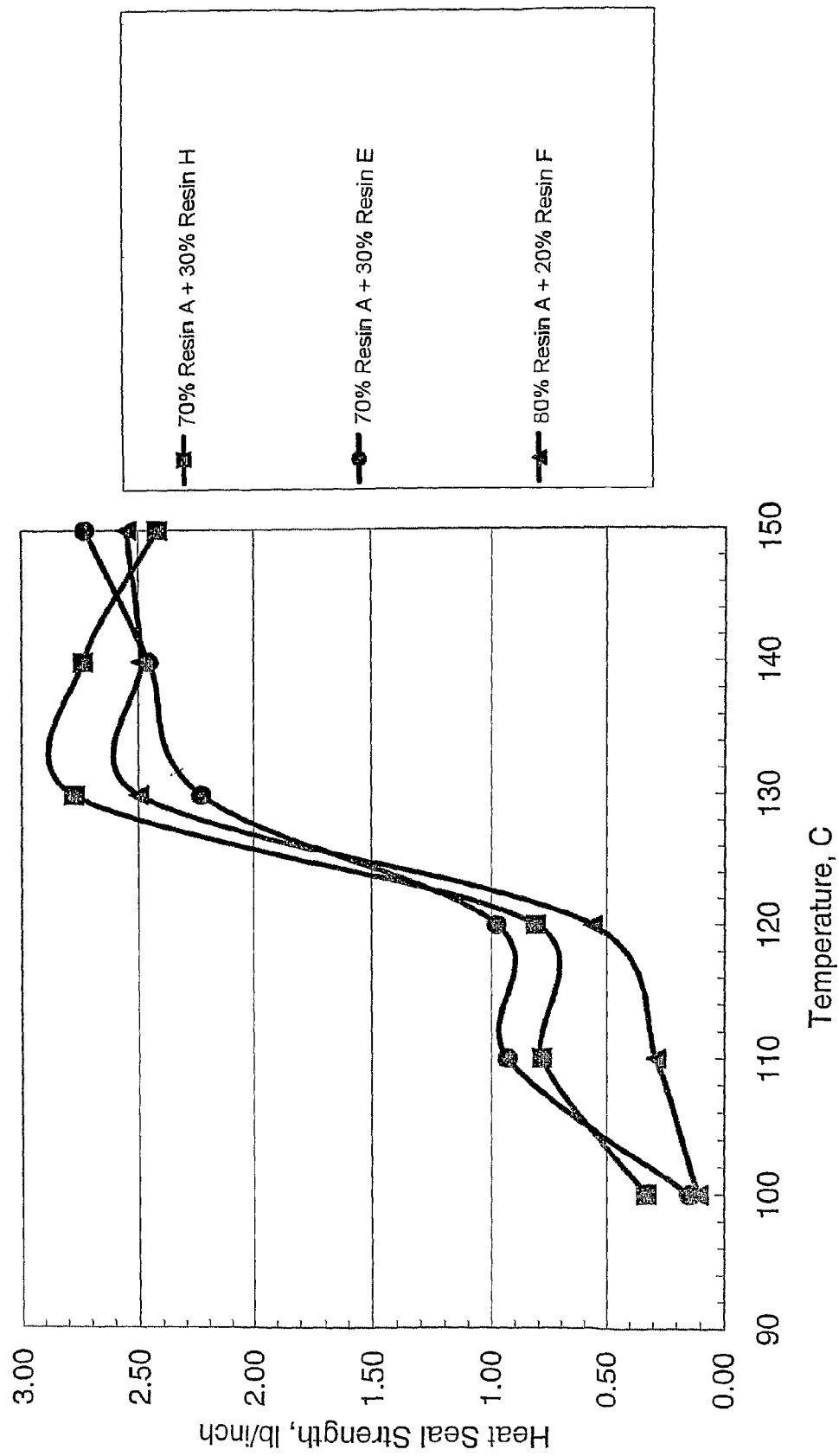
FIG. 1 is a graph showing heat seal strengths over a range of sealing temperatures for Example 1.

The term "polymer", as used herein, refers to a polymeric compound prepared by polymerizing monomers, whether of the same or a different type. The generic term polymer thus embraces the term "homopolymer", usually employed to refer to polymers prepared from only one type of monomer as well as "copolymer" which refers to polymers prepared from two or more different monomers.

The term "low density polyethylene" may also be referred to as "LDPE", "high pressure ethylene polymer" or "highly branched polyethylene" and is defined to mean that the polymer is partly or entirely homopolymerized or copolymerized in autoclave or tubular reactors at pressures above 14,500 psi (100 MPa) with the use of free-radical initiators, such as peroxides (see for example U.S. Pat. No. 4,599,392, herein incorporated by reference).

The term molecular weight distribution or "MWD" is defined as the ratio of weight average molecular weight to number average molecular weight ($M_w/M_n$). $M_w$ and $M_n$ are determined according to methods known in the art using conventional GPC.

The ratio Mw(absolute)/Mw(GPC) is defined wherein Mw(absolute) is the weight average molecular weight derived from the light scattering area at low angle (such as 15 degrees) and injected mass of polymer and the Mw(GPC) is the weight average molecular weight obtained from GPC calibration. The light scatter detector is calibrated to yield the equivalent weight average molecular weight as the GPC instrument for a linear polyethylene homopolymer standard such as NBS 1475.

"Melt strength" which is also referred to in the relevant art as "melt tension" is defined and quantified herein to mean the stress or force (as applied by a wind-up drum equipped with a strain cell) required to draw a molten extrudate at a haul-off velocity at which the melt strength plateaus prior to breakage rate above its melting point as it passes through the die of a standard plastometer such as the one described in ASTM D1238-E. Melt strength values, which are reported herein in centi-Newtons (cN), are determined using a Gottfert Rheotens at 190° C.

The present invention relates to a blend of at least two components, which blends are particularly well suited for use as a peelable seal.

The first component in the blends of the present invention is a propylene-based plastomer or elastomer or "PBPE". These materials comprise at least one copolymer with at least about 50 weight percent of units derived from propylene and at least about 5 weight percent of units derived from a comonomer other than propylene. Suitable propylene based elastomers and/or plastomers are taught in WO03/040442, and U.S. application 60/709,688 (filed Aug. 19, 2005), each of which is hereby incorporated by reference in its entirety.

Of particular interest for use in the present invention are reactor grade PBPEs having MWD less than 3.5. It is intended that the term "reactor grade" is as defined in U.S. Pat. No. 6,010,588 and in general refers to a polyolefin resin whose molecular weight distribution (MWD) or polydispersity has not been substantially altered after polymerization. The preferred PBPE will have a heat of fusion (as determined using the DSC method described in U.S. application 60/709,688) less than about 90 Joules/gm, preferably less than about 70 Joules/gm, more preferably less than about 50 Joules/gm. When ethylene is used as a comonomer, the PBPE has from 3 to 15 percent of ethylene, or from 5 to 14 percent of ethylene, or 7 to 12 percent ethylene, by weight of the propylene based elastomer or plastomer.

Although the remaining units of the propylene copolymer are derived from at least one comonomer such as ethylene, a $C_{4-20}$ α-olefin, a $C_{4-20}$ diene, a styrenic compound and the like, preferably the comonomer is at least one of ethylene and a $C_{4-12}$ α-olefin such as 1-hexene or 1-octene. Preferably, the remaining units of the copolymer are derived only from ethylene.

The amount of comonomer other than ethylene in the propylene based elastomer or plastomer is a function of, at least in part, the comonomer and the desired heat of fusion of the copolymer. If the comonomer is ethylene, then typically the comonomer-derived units comprise not in excess of about 15 wt percent of the copolymer. The minimum amount of ethylene-derived units is typically at least about 3, preferably at least about 5 and more preferably at least about 9, wt percent based upon the weight of the copolymer. If the polymer comprises at least one other comonomer other than ethylene, then the preferred composition would have a heat of fusion approximately in the range of a propylene-ethylene copolymer with 3 to 20 wt. percent ethylene. Though not intending to be bound by theory, it is thought that attaining approximately similar crystallinity and crystal morphology is beneficial to achieving similar functionality as a peelable seal.

The propylene based plastomer or elastomer of this invention can be made by any process, and includes copolymers made by Ziegler-Natta, CGC (Constrained Geometry Catalyst), metallocene, and nonmetallocene, metal-centered, heteroaryl ligand catalysis. These copolymers include random, block and graft copolymers although preferably the copolymers are of a random configuration. Exemplary propylene copolymers include Exxon-Mobil VISTAMAXX polymer, and VERSIFY propylene/ethylene elastomers and plastomers by The Dow Chemical Company.

The density of the propylene based elastomers or plastomers of this invention is typically at least about 0.850, can be at least about 0.860 and can also be at least about 0.865 grams per cubic centimeter (g/cm$^3$) as measured by ASTM D-792. Preferably the density is less than about 0.89 g/cc.

The weight average molecular weight (Mw) of the propylene based elastomers or plastomers of this invention can vary widely, but typically it is between 10,000 and 1,000,000 (with the understanding that the only limit on the minimum or the maximum $M_w$ is that set by practical considerations). For homopolymers and copolymers used in the manufacture of peelable seals, preferably the minimum Mw is about 20,000, more preferably about 25,000.

The polydispersity of the propylene based elastomers or plastomers of this invention is typically between 2 and 5. "Narrow polydispersity", "narrow molecular weight distribution", "narrow MWD" and similar terms mean a ratio ($M_w/M_n$) of weight average molecular weight ($M_w$) to number average molecular weight ($M_n$) of less than about 3.5, can be less than about 3.0, can also be less than about 2.8, can also be less than about 2.5.

The PBPEs for use in the present invention ideally have an MFR of from 0.5 to 2000 g/10 min, preferably from 1 to 1000, more preferably from 2 to 500, still more preferably from 2 to 40. The particular MFR selected will depend in part on the intended fabrication methods such as blown film, extrusion coating, sheet extrusion, injection molding or cast film processes. MFR for copolymers of propylene and ethylene and/ or one or more $C_4$-$C_{20}$ α-olefins is measured according to ASTM D-1238, condition L (2.16 kg, 230 degrees C.). MFRs greater than about 250 were estimated according to the following correlation:

$$MFR = 9 \times 10^{18} \, Mw^{-3.3584}$$

Mw (grams per mole) was measured using gel permeation chromatography.

The overall blends for use in the present invention will comprise a second polymer. Suitable materials for the second polymer may include polyethylene (including low density polyethylene, linear low density polyethylene, very low (or ultra low) density polyethylene, medium density polyethylene and high density polyethylene), polybutylene, general purpose polystyrene ("GPPS") and high impact polystyrene ("HIPS"), graft-modified ethylene polymer, ethylene-styrene interpolymers (ESI), ethylene vinyl acetate interpolymer, ethylene acrylic acid interpolymer, ethylene ethyl acrylate interpolymer, ethylene methacrylic acid interpolymer, ethylene methacrylic acid ionomer, and the like), polycarbonate, thermoplastic polyurethane, polyamide, polylactic acid interpolymer, thermoplastic block polymer (for example styrene butadiene copolymer, styrene butadiene styrene triblock copolymer, styrene ethylene-butylene styrene triblock copolymer and the like), polyether block copolymer (for example, PEBAX), copolyester polymer, polyester/polyether block polymers (for example, HYTREL), ethylene carbon monoxide interpolymer (for example, ethylene/carbon monoxide (ECO), copolymer, ethylene/acrylic acid/carbon monoxide (EAACO) terpolymer, ethylene/methacrylic acid/carbon monoxide (EMAACO) terpolymer, ethylene/vinyl acetate/carbon monoxide (EVACO) terpolymer and styrene/ carbon monoxide (SCO)), polyethylene terephthalate (PET), chlorinated polyethylene, and the like and mixtures thereof. Preferred material for the second polymer include the polyethylene and styrenic polymers. The preferred polyethylene materials are LDPE, and HDPE, with LDPE being most preferred for many applications. The preferred styrenic materials are GPPS and HIPS.

Materials such as polystyrene are less miscible (or have a higher degree of incompatibility), and thus less of the second polymer would be required in order to have a peelable seal. When LDPE is used as the second polymer, on the other hand, relatively more of the second polymer is normally necessary.

If LDPE is desired to be used in the present invention, then any LDPE may be selected. The preferred LDPE for use in the present invention has a Melt Index ($I_2$) (determined by ASTM D1238, condition 190° C./2.16 kg), of from 0.2 to 100 g/10 min. More preferably the melt index is greater than about 0.2, most preferably more than 0.5 g/10 min. The melt index is preferably less than about 50, more preferably less than about 20, and most preferably less than about 10 g/10 min. The preferred LDPE will also have a density (as determined in accordance with ASTM D792) in the range of 0.915 to 0.930 g/cc, preferably 0.915 to 0.925 g/cc.

Such preferred LDPE can be made in an autoclave or tubular reactor.

The second component of the present invention may also include LDPE/LDPE blends, for example, blends in which one of the LDPE resins has a relatively higher melt index and the other has a lower melt index and is more highly branched. The component with the higher melt index can be obtained from a tubular reactor, and a lower MI, higher branched, component of the blend may be added in a separate extrusion step or using a parallel tubular/autoclave reactor in combination with special methods to control the melt index of each reactor, such as recovery of telomer in the recycle stream or adding fresh ethylene to the autoclave (AC) reactor, or any other methods known in the art.

Suitable high pressure ethylene polymer compositions for use in preparing the inventive extrusion composition include low density polyethylene (homopolymer), ethylene copolymerized with at least one α-olefin for example butene, and ethylene copolymerized with at least one α,β-ethylenically unsaturated comonomers, for example, acrylic acid, methacrylic acid, methyl acrylate and vinyl acetate. A suitable technique for preparing useful high pressure ethylene copolymer compositions is described by McKinney et al. in U.S. Pat. No. 4,599,392, the disclosure of which is incorporated herein by reference.

While both high pressure ethylene homopolymers and copolymers are believed to be useful in the invention, homopolymer polyethylene is generally preferred.

For some applications polystyrene based materials may be preferred to be used as the second polymer. GPPS and HIPS have shown to be very immiscible (that is have a high degree of incompatibility) in PBPE. Thus, relatively small amounts, for example 2 to 20 percent by weight) of these polymers may be used with the PBPE and still produce a peelable seal. When clarity is important it is preferred to use less of the polystyrene materials, for example 2-5 percent by weight.

It has also been observed that when materials having a high degree of incompatibility with the PBPE, like the polystyrene based materials, are used, stress whitening occurs when the seal is peeled. Thus these materials can be used to provide tamper evident peelable seals.

The compositions of the present invention will comprise at least a propylene based elastomer or plastomer component and a second polymer such as polystyrene or the polyethylene. The second polymer material will comprise from two to 95 percent by weight of the overall material. When polyethylene is used as the second polymer material, the polyethylene will comprise at least about 20 percent by weight, more preferably (for ease of converter processability) fifty percent by weight, still more preferably 60, still more preferably 75 percent by weight of the overall composition. The polyethylene component will preferably comprise less than 95 percent, more preferably less than 85 percent and most preferably less than 80 percent by weight of the overall composition.

In case low heat seal initiation temperature, and/or high hot tack strength is desired, it may be preferred to have the polyethylene comprise less than about 60 percent, preferably less than 40 percent and even more preferably less than 30 percent of the overall composition.

When polystyrene is used as the second polymer the polystyrene will preferably comprise from 2 to 20 percent by weight of the overall composition, more preferably from 2 to 10 percent by weight and still more preferably from 2 to 5 percent by weight. The PBPE will comprise at least 5 percent, preferably more than about 15 percent, more preferably at least about 25 percent by weight of the overall composition. The PBPE will comprise less than 98 percent, by weight of the overall composition.

The seals of the present invention can be made by any process such as blown film, extrusion coating, sheet extrusion, injection molding or cast film processes. The peelable seal layer can be made in any desired thickness, for example from 1 micron to 3 mm. The sealant layer can be used as a monolayer, but more typically will be one layer of a multilayer structure, for example a 10 micron sealant layer with a 30 micron supporting layer.

When the sealant layer (particularly a sealant layer comprising a majority of PBPE) is coextruded on a substrate which is PP based then the whole structure will be recyclable.

Peelable seals made from the blends of the present invention will have an aged seal strength of 0.5 to 7 lb/in., 0.5 to 5 lb/in., preferably 0.5 to 2 lb/in. as determined using the Topwave HT tester with a 0.5 sec dwell time and a 40 psi bar pressure using Instron pulled at 10 in/min after at least 24 hours of welding seal. It should be understood by one of ordinary skill in the art that the seal strength may typically be somewhat less for flexible packaging and somewhat higher for rigid packaging.

The peelable seals of the present invention will have a heat seal initiation temperature of less than 120° C., preferably less than 110° C., more preferably less than 100° C. The heat seal initiation temperature is defined as the minimum temperature at which the seal strength of 0.5 lb/inch is obtained using the Topwave HT tester with a 0.5 sec dwell time, with a 40 psi bar pressure pulled on Instron at 10 in/min after 24 hours of welding seal.

It should also be understood that the composition of the present invention may also contain various additives as is generally known in the art. Examples of such additives include antioxidants, ultraviolet light stabilizers, thermal stabilizers, slip agents, antiblock, pigments or colorants, processing aids (such as fluoropolymers), crosslinking catalysts, flame retardants, fillers, foaming agents, etc.

The following Examples further illustrate the present invention.

EXAMPLES

A description of all of the resins used in the Examples is presented in Table 1.

| Resin | Description | Comonomer | Melt index* (g/10 min) | Density (g/cc) | MFR** (g/10 min) |
|---|---|---|---|---|---|
| A | High Pressure LDPE | None | 1.9 | 0.922 | |
| B | High Pressure LDPE | None | 4.15 | 0.924 | |
| C | High Pressure LDPE | None | 0.7 | 0.922 | |
| D | PBPE | 5 percent Ethylene | | 0.888 | 2 |
| E | PBPE | 9 percent Ethylene | | 0.876 | 8 |
| F | PBPE | 5 percent Ethylene | | 0.888 | 8 |
| G | PBPE | 12 percent Ethylene | | 0.8665 | 8 |
| H | PBPE | 9 percent Ethylene | | 0.876 | 2 |
| I | Random Copolymer polypropylene | Ethylene | | 0.9 | 2 |
| J | Polystyrene | None | | 1.05 | 7.5 |

*determined using ASTM D-1238 (2.16 kg, 190° C.)
**determined using ASTM D-1238 (2.16 kg, 230° C.) except for Resin J (5 kg, 200° C.)

A series of structures using these materials is prepared and the seal strength can be measured.

Example 1

The first set of structures are an A/B/C structure in which the A layer comprises a 0.7 mil nylon backing layer, the B layer is a 0.7 mil tie layer which consists of 85 percent ATTANE 4202 ultra low density polyethylene (3.2 $I_2$, 0.913 g/cc density) blended with AMPLIFY GR205 functional polymer (maleic anhydride grafted polyethylene with 0.962 density, 2.0 $I_2$), and the C layer is a 2.1 mil sealant layer, as indicated in FIG. 1. The structures are sealed using 40 psi bar pressure and a dwell time of a half second, at the temperatures indicated. The seal strength is measured using an using Instron Tensile tester pulled at 90° angle from the seal at a crosshead speed of 10 inches/min after 24 hours of welding seal.

Example 2

Figure 2:
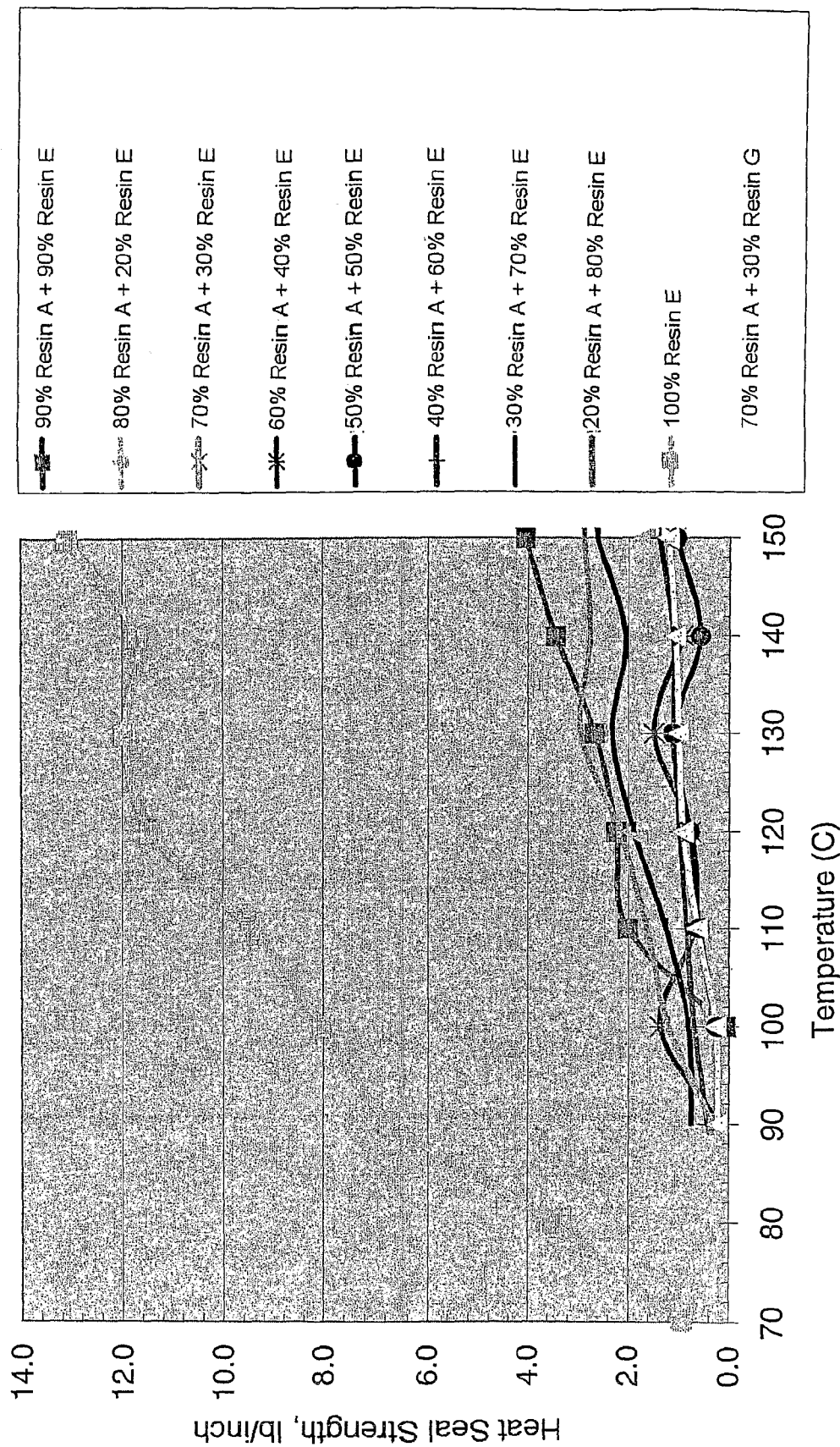
FIG. 2 is a graph showing heat seal strengths over a range of sealing temperatures for Example 2.

A second series of structures is prepared in a A/B structure in which the A layer is 1.7 mil layer comprising a gas phase HDPE having a 0.961 density and a 0.85 $I_2$, and the B layer is a 0.3 mil layer of the sealant as indicated in FIG. 2. The seal strength of these structures is determined as before at the range of sealing temperatures indicated on FIG. 2.

Example 3

Figure 3:
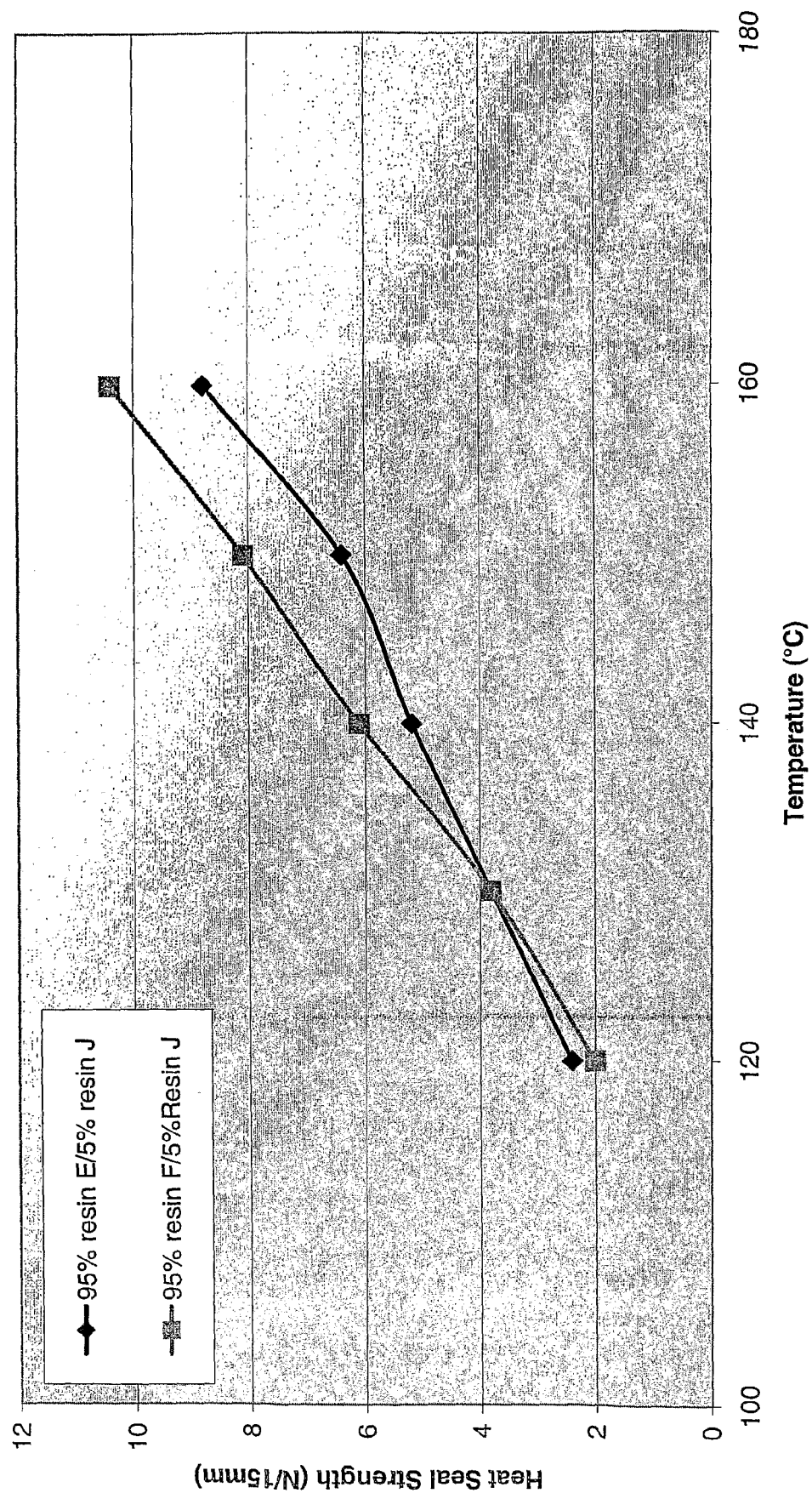
FIG. 3 is a graph showing heat seal strengths over a range of sealing temperatures for Example 3.

A third series of structures is prepared and the seal strength is measured. An A/B structure is prepared in which the A layer is a 50 μm backing layer of RCP, and the B layer is a 10 micrometer thick layer made from a blend of 95 percent by weight resin F and 5 percent by weight resin J. A second A/B structure is prepared in the same way except that the B layer is a blend of 95 percent resin E and 5 percent resin J. The structures are sealed onto a 750 μm homopolymer polypropylene sheet using 0.5 N/mm² pressure and a dwell time of 2 seconds at different temperatures as indicated on FIG. 3. The seal strength is measured using an Instron Tensile tester pulled at 90° angle from the seal at a crosshead speed of 100 mm/min after at least 24 hours of welding seal. The results are depicted in FIG. 3. Typical seal strength values obtained are in the range of 2 to 10 N/15/mm over the temperature range of 120 to 160° C., demonstrating the utility of the present invention. Moreover, upon peeling apart the seal, stress whitening effects on the seal surface are evident.

What is claimed is:

1. A peelable seal layer comprising:
   a. from about 5 to about 98 percent by weight of a reactor grade propylene based plastomer or elastomer having a molecular weight distribution of less than 3.5 and a density of less than about 0.89 g/cc;
   b. from about 2 to about 95 percent by weight of a second polymer selected from the group consisting of polyethylene, polybutylene, and styrenic polymer and mixtures thereof;
      wherein the peelable seal has a heat seal initiation temperature less than 120° C. when sealed at a bar pressure of 40 psi with a dwell time of 0.5 seconds.

2. The peelable seal of claim 1 wherein the second polymer is a polyethylene selected from the group consisting of low density polyethylene, linear low density polyethylene, ultra or very low density polyethylene, medium density polyethylene, high density polyethylene, ethylene vinyl acetate copolymers and mixtures thereof.

3. The peelable seal of claim 1 wherein the second polymer is a styrenic polymer selected from the group consisting of general purpose polystyrene ("GPPS") and high impact polystyrene ("HIPS"), ethylene-styrene interpolymers (ESI), styrenic block polymer, and mixtures thereof.

4. The peelable seal of claim 1 wherein the propylene based elastomer or plastomer contains from about 5% to about 15% by weight of the propylene based elastomer or plastomer of units derived from ethylene.

5. The peelable seal of claim 1 wherein the propylene based elastomer or plastomer has a heat of fusion less than 90 J/gm.

6. The peelable seal of claim 1 wherein the propylene based elastomer or plastomer has a heat of fusion less than 70 J/gm.

7. The peelable seal of claim 1 wherein the second polymer is a low density polyethylene.

8. The peelable seal of claim 1 wherein the second polymer is an ethylene vinyl acetate copolymer.

9. The peelable seal of claim 1 further comprising one or more additives from a group comprising antioxidants, ultraviolet light stabilizers, thermal stabilizers, slip agents, antiblock, pigments or colorants, processing aids, crosslinking catalysts, flame retardants, fillers and foaming agents.

10. The peelable seal of claim 9 characterized in that the seal exhibits stress whitening upon un sealing.

11. The peelable seal of claim 1 wherein the seal has a seal strength in the range of 0.5 to 5 lb/in.

12. The peelable seal of claim 1 wherein the seal has a seal strength in the range of 1.5 to 3 lb/in.

13. The peelable seal of claim 7 wherein the LDPE comprises 20 to 40 percent by weight of the overall composition.

14. The peelable seal of claim 3 wherein the styrenic polymer comprises 2 to 20 percent by weight of the overall composition.

15. The peelable seal of claim 14 which is characterized by exhibiting some amount of stress whitening upon peeling of the seal.

16. The peelable of seal of claim 14 wherein the styrenic polymer comprises from 2 to 5 percent by weight of the composition and the peelable seal is characterized as having a haze less than 15% for 60 micron films as determined by ASTM 1003.

17. The peelable seal of claim 2 further comprising polybutylene.

18. The peelable seal of claim 1 wherein the seal has a seal strength in the range of 0.5 to 7 lb/in.

19. The peelable seal of claim 7 wherein the LDPE comprises 10 to 40 percent by weight of the overall composition.

20. The peelable seal of claim 1 wherein the peelable seal has a heat seal initiation temperature less than 100° C.

* * * * *